(12) United States Patent
Gustafsson et al.

(10) Patent No.: US 10,057,375 B2
(45) Date of Patent: Aug. 21, 2018

(54) DISTRIBUTED DEPLOYMENT BASED ON RATING VALUES

(71) Applicant: Telefonaktiebolaget LM Ericsson (publ), Stockholm (SE)

(72) Inventors: Harald Gustafsson, Lund (SE); Per Persson, Sodra Sandby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 256 days.

(21) Appl. No.: 15/103,877

(22) PCT Filed: Dec. 13, 2013

(86) PCT No.: PCT/EP2013/076539
§ 371 (c)(1),
(2) Date: Jun. 12, 2016

(87) PCT Pub. No.: WO2015/086090
PCT Pub. Date: Jun. 18, 2015

(65) Prior Publication Data
US 2017/0026491 A1 Jan. 26, 2017

(51) Int. Cl.
*G06F 15/173* (2006.01)
*H04L 29/08* (2006.01)
*G06F 8/60* (2018.01)

(52) U.S. Cl.
CPC ........... *H04L 67/34* (2013.01); *G06F 8/60* (2013.01); *H04L 67/104* (2013.01); *H04L 67/322* (2013.01)

(58) Field of Classification Search
CPC ........... G06F 11/3409; G06F 11/3452; G06F 11/3495; G06F 2201/87; G06F 8/60;
(Continued)

(56) References Cited

U.S. PATENT DOCUMENTS 7,181,731 B2 * 2/2007 Pace ................... G06F 8/60
707/999.01
7,640,339 B1 * 12/2009 Caronni ............ H04L 43/0817
709/220
(Continued)

OTHER PUBLICATIONS

PCT International Search Report, dated Jun. 20, 2014, in connection with International Application No. PCT/EP2013/076539, all pages.
(Continued)

*Primary Examiner* — Christopher Biagini
(74) *Attorney, Agent, or Firm* — Leffler Intellectual Property Law, PLLC (57) ABSTRACT

A first deployment node connectable to a plurality of neighboring deployment nodes of a distributed deployment network for distributed deployment of a software application separable into a plurality of executable software modules is disclosed. The first deployment node comprises a hardware arrangement, a deployment operating system, and a deployment node interface. The deployment node interface is adapted to establish a connection between the first deployment node and the plurality of neighboring deployment nodes. The hardware arrangement is adapted to keep (for each of the neighboring deployment nodes) a node rating value associated with the neighboring deployment node and at least one group rating value associated with a group of deployment nodes comprising the neighboring deployment node. The deployment operating system is adapted to transfer a first executable software module for deployment from the first deployment node to a neighboring deployment node selected among the neighboring deployment nodes based on the node rating values and the group rating values of the neighboring deployment nodes. The deployment operating system is also adapted to perform an assessment of the deployment of the first executable software module at the selected neighboring deployment node, update the node
(Continued)

rating value and the group rating value associated with the selected neighboring deployment node based on the assessment and transmit the updated node rating value and the updated group rating value associated with the selected neighboring deployment node to the plurality of neighboring deployment nodes.

13 Claims, 2 Drawing Sheets

(58) Field of Classification Search
CPC ........ G06F 8/61; G06F 9/4881; G06F 9/5083; H04L 41/0823; H04L 43/0817; H04L 67/104; H04L 67/322; H04L 67/34
See application file for complete search history.

(56) References Cited

U.S. PATENT DOCUMENTS

| | | | | |
|---|---|---|---|---|
| 9,077,580 | B1* | 7/2015 | Randhawa | H04L 29/06 |
| 9,253,055 | B2* | 2/2016 | Nelke | H04L 41/5051 |
| 2005/0198388 | A1* | 9/2005 | Teodosiu | G06F 9/4416 709/245 |
| 2006/0179431 | A1* | 8/2006 | Devanathan | G06F 8/61 717/168 |
| 2007/0094279 | A1* | 4/2007 | Mittal | H04L 67/104 |
| 2009/0113327 | A1* | 4/2009 | Pogrebinsky | G06F 8/61 715/765 |
| 2012/0192181 | A1* | 7/2012 | Gilbert | G06F 9/45558 718/1 |
| 2014/0229607 | A1* | 8/2014 | Jung | H04L 43/0876 709/224 |

OTHER PUBLICATIONS

PCT Written Opinion, dated Jun. 20, 2014, in connection with International Application No. PCT/EP2013/076539, all pages.
Petri, I et al. Trust modelling and analysis in peer-to-peer clouds, Int. J. Cloud Computing, vol. 1, Nos. 2/3, 2012, pp. 221-239.
Rahman M et al., Reputation-based dependable scheduling of workflow applications in Peer-to Peer Grids, Computer Networks 54, 2010, pp. 3341-3359.
Malik S., et al., RACS: A framework for Resource Aware Cloud computing, 7th International Conference for Internet Technology and Secured Transactions (ICITST), London Dec. 10-12, 2012, pp. 680-687.
Malik S., et al., Reliability aware scheduling in cloud computing, 7th International Conference for Internet Technology and Secured Transactions (ICITST), London, Dec. 10-12, 2012, pp. 194-200.
Azeez I.A., et al., Resource Management in Grid Computing: A Review, Greener Journal of Science Engineering and Technological Research, vol. 2(1), Apr. 2012, pp. 24-31.
Kamvar S.D., et al., The EigenTrust Algorithm for Reputation Management in P2P Networks, Proceedings of the 12th International World Wide Web Conference, Budapest, Hungary, 2003, 12 pages.
Khalid O., et al., Comparative study of trust and reputation systems for wireless sensor networks, Security and Communication Networks, vol. 6, Issue 6, Jun. 2013, pp. 669-688.
Tian Y., et al., On Distributed Rating Systems for Peer-to-Peer Networks, The Computer Journal, vol. 51, No. 2, 2008, 19 pages.
Buchegger, S. et al., A Robust Reputation System for P2P and Mobile Ad-hoc Networks, National Competence Center in Research on Mobile Information and Communication Systems (NCCR_MICS), 2004, pp. 1-6.
Sonnek, J. et al., Reputation-Based Scheduling on Unreliable Distributed Infrastructures, Proceedings of the 26th International Conference on Distributed Computing Systems, 2006, 8 pages.
Bertrand et al., Seeing the Bigger Picture: How Nodes Can Learn Their Place Within a Complex Ad Hoc Network Topology, IEEE Signal Processing Magazine, May 2013, pp. 71-82.

* cited by examiner

DISTRIBUTED DEPLOYMENT BASED ON RATING VALUES

TECHNICAL FIELD

The present invention relates generally to the field of distributed deployment of software applications separable into a plurality of executable software modules.

BACKGROUND

In some (future) scenarios, huge amounts of devices of any imaginable type are connected to numerous other devices, either directly or over various networks (e.g. cloud-based systems). In such scenarios, the devices may be utilized in combination, as a distributed deployment network, by an application to form services. Such services may in turn make up parts of a larger application, etc.

Different devices may have various different capabilities that may be offered to the application. Examples of capabilities include providing a location to execute, providing input data for processing, providing output actuating capabilities, or any combination thereof.

A distributed application is an application split into two or more different tasks which are assigned to different devices (also referred to as deployment nodes or simply nodes in this context) of a distributed deployment network. If an application distributed over many nodes is to work properly, the different tasks that make up the application need to be properly scheduled. Thus, a scheduling function that decide where and when each task should execute is needed in association with the distributed deployment network.

Several systems exist for scheduling tasks on different nodes of a distributed deployment network. For example, Malik, Huet and Caromel, "RACS: A Framework for Resource Aware Cloud Computing", The IEEE 7$^{th}$ International Conference for Internet Technology and Secured Transactions (ICITST-2012) discloses a cloud scheduler module which helps the scheduler in making scheduling decisions on the basis of different characteristics of cloud resources.

Hence, when an application requires some particular capability a particular device is selected that provides that capability. If that selection is based only on the self-stated capabilities of the devices the result may be sub-optimal since the self-stated capability of a device may, for various reasons, differ more or less significantly from the actual capability of the device.

There exist peer-to-peer systems that calculate a parameter value (e.g. a trust value) for other peers. For example, Petri, Rana, Rezgui and Cosmin Silaghi, "Trust modelling and analysis in peer-to-peer clouds", International Journal of Cloud Computing, Volume 1, Nos. 2/3, 2013 discloses a mechanism of forming trustworthy peer-to-peer clouds where feedback aggregation is used for identifying the trust distribution and Bertrand and Moonen, "Seeing the Bigger Picture: How Nodes Can Learn Their Place Within a Complex Ad Hoc Network Topology", IEEE Signal Processing Magazine, May 2013, pp. 71-82 discloses how nodes in a network graph can infer information about the network topology or its topology-related properties based on in-network distributed learning.

There is a need for alternative methods and arrangements for scheduling of tasks in a distributed deployment network. Preferably, such alternatives are robust and easily scalable.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide alternative methods and arrangements for scheduling of tasks in a distributed deployment network.

According to a first aspect, this is achieved by a first deployment node connectable to a plurality of neighboring deployment nodes of a distributed deployment network for distributed deployment of a software application separable into a plurality of executable software modules.

The first deployment node comprises a hardware arrangement, a deployment operating system, and a deployment node interface.

The deployment node interface is adapted to establish a connection between the first deployment node and the plurality of neighboring deployment nodes.

The hardware arrangement is adapted to keep, for each of the neighboring deployment nodes, a node rating value associated with the neighboring deployment node and at least one group rating value associated with a group of deployment nodes comprising the neighboring deployment node.

The deployment operating system is adapted to transfer a first executable software module from the first deployment node to a selected neighboring deployment node for deployment (wherein the selected neighboring deployment node is selected among the neighboring deployment nodes based on the node rating values and the group rating values of the neighboring deployment nodes), perform an assessment of the deployment of the first executable software module at the selected neighboring deployment node, update the node rating value and the group rating value associated with the selected neighboring deployment node based on the assessment, and transmit the updated node rating value and the updated group rating value associated with the selected neighboring deployment node to the plurality of neighboring deployment nodes.

The hardware arrangement may, for example, comprise one or more of a memory, a processor, a controller, a sensor, and an actuator. Example sensors include, but are not limited to, an accelerometer, a gyroscope, a positioning device (e.g. a global positioning system—GPS—device), a humidity sensor, a temperature sensor, a barometer sensor, an altitude sensor, a magnetic sensor, a time sensor, a pressure sensor, a weight sensor, a sound-level sensor, a microphone sensor, a visual sensor, a camera, a video-camera, an infra-red (IR) camera, an ultra-violet (UV) camera, a touch screen, and a key. Example actuators include, but are not limited to, a display, relay, a motor controller, a solenoid controller, a heating device, a light controller, a sound controller, an electro/magnetic-field controller, etc.

Deployment on the selected neighboring deployment node may, for example, comprise execution of the first executable software module and/or a further transfer of the first executable software module to a deployment node selected in turn at the selected neighboring deployment node.

The plurality of neighboring deployment nodes typically comprise all or a subset of the deployment nodes of a distributed deployment network.

A neighboring deployment node may, for example, be defined as a node to which the first deployment node is connectable.

Each of the connections between the first deployment node and the plurality of neighboring deployment nodes established by the deployment node interface may comprise a hard-wired connection, but typically comprises a wireless connection. Furthermore, each of the connections may be direct (peer-to-peer) connection or an indirect connection, e.g. transferred via one or more other devices such as a WiFi base station, a cellular base station, a switch and/or a router.

Keeping of the node rating values and the group rating values may, for example, be realized by means of a register, a memory, or a permanent storage of the hardware arrangement.

Each group of deployment nodes may, according to some embodiments, comprise deployment nodes of one of: a particular type, a particular manufacturer, a particular supplier, and a particular operator.

In some embodiments, the rating values may for each of the neighboring deployment nodes may be arranged in a vector of dimension N, wherein one of the elements of the vector comprises the node rating value and other elements of the vector each comprises a group rating value associated with a group of deployment nodes comprising the neighboring deployment node. Thus, N may be equal to 2 if one group (e.g. manufacturer) is considered and equal to 3 if two groups (e.g. manufacturer and operator) are considered, and so on.

Each (node and/or group) rating value may comprise one or more values related to one or more parameters. Example parameters include, but are not limited to, latency (e.g. in communication), throughput (e.g. in execution), timeliness of access (e.g. to sensors and/or actuators), precision of access (e.g. to sensors and/or actuators), processing capability, availability (up-time), sensing capability, accuracy/precision (e.g. in measurements), Quality of Service (QoS), closeness to location of the first deployment node, etc.

The assessment may, for example, comprise measuring a value of a parameter and compare it to one or more parameter value thresholds. For example, a parameter value threshold may comprise one of an expected value of the parameter and the kept rating value related to the parameter.

For example, a (node or group) rating value may be updated by adding a weighted assessment value (e.g. a measured value of a parameter) to a scaled version of the rating value. A sum of the weight and the scaling factor may equal 1.

The deployment operating system may, in some embodiments, be further adapted to select the selected neighboring deployment node among the neighboring deployment nodes based on the node rating values and the group rating values of the neighboring deployment nodes.

For example, the selection may be according to a probability distribution of the neighboring deployment nodes, wherein the probability distribution is based on the node rating values and the group rating values kept by the first deployment node. Example probability distributions include, but are not limited to, the probability of each neighboring deployment node being equal to a (node or group) rating value of the node normalized over all (or a subset) of the neighboring deployment nodes, or being equal to a (possibly) weighted average of the probabilities associated with each of the rating values of the neighboring deployment node, a poisson distribution based on the index of each neighboring deployment node in a list sorted according to one or more of the rating values of each neighboring deployment node, and a uniform (rectangular) distribution over a subset of the neighboring deployment node wherein the subset comprises the neighboring deployment nodes with highest (or lowest depending on the indexing) index in a list sorted according to one or more of the rating values of each neighboring deployment node.

In some embodiments, the selection is a stochastic processed based on the probability distribution.

According to some embodiments, the selection comprises selecting the neighboring deployment node with highest (or lowest depending on the indexing) index in a list sorted according to one or more of the rating values of each neighboring deployment node.

In some embodiments, selection of the selected neighboring deployment node among the neighboring deployment nodes based on the node rating values and the group rating values of the neighboring deployment nodes may be performed by the first executable software module and not by the deployment operating system.

According to some embodiments, the hardware arrangement may be further adapted to keep a node rating value associated with the first deployment node and at least one group rating value associated with a group of deployment nodes comprising the first deployment node.

In such (and other) embodiments, the deployment node interface may be further adapted to receive a second executable software module from one of the plurality of neighboring deployment nodes for deployment and the deployment operating system may be further adapted to cause deployment of the second executable software module using the hardware arrangement. The second executable software module may or may not be equal to the first executable software module.

In those embodiments, the deployment operating system may be further adapted to perform a self-assessment of the deployment of the second executable software module at the first deployment node, update the node rating value and the group rating value associated with the first deployment node based on the self-assessment, and transmit the updated node rating value and the updated group rating value associated with the first deployment node to the plurality of neighboring deployment nodes.

In some embodiments, the deployment node interface may be further adapted to receive (from one or more of the plurality of neighboring deployment nodes) indications of a node rating value and a group rating value associated with a particular one of the plurality of neighboring deployment nodes and kept by the one or more of the plurality of neighboring deployment nodes. The operating system may be further adapted to update the node rating value and the group rating value associated with the particular neighboring deployment node and kept by the first deployment node based on the received indications, and transmit the updated node rating value and the updated group rating value associated with the particular neighboring deployment node and kept by the first deployment node to the plurality of neighboring deployment nodes.

In some embodiments, the deployment node interface may be further adapted to receive (from one or more of the plurality of neighboring deployment nodes) indications of a node rating value and a group rating value associated with the first neighboring deployment node and kept by the one or more of the plurality of neighboring deployment nodes. The operating system may be further adapted to update the node rating value and the group rating value associated with the first neighboring deployment node and kept by the first deployment node based on the received indications, and transmit the updated node rating value and the updated group rating value associated with the first neighboring deployment node and kept by the first deployment node to the plurality of neighboring deployment nodes.

A second aspect is a distributed deployment network for distributed deployment of a software application separable into a plurality of executable software modules. The distributed deployment network comprises the first deployment node according to the first aspect and a plurality of other deployment nodes.

According to a third aspect, a method is provided of a first deployment node connectable to a plurality of neighboring deployment nodes of a distributed deployment network for distributed deployment of a software application separable into a plurality of executable software modules.

The method comprises keeping (for each of the neighboring deployment nodes) a node rating value associated with the neighboring deployment node and at least one group rating value associated with a group of deployment nodes comprising the neighboring deployment node, selecting a neighboring deployment node among the neighboring deployment nodes based on the node rating values and the group rating values of the neighboring deployment nodes, and transferring a first executable software module from the first deployment node to the selected neighboring deployment node for deployment.

The method also comprises performing an assessment of the deployment of the first executable software module at the selected neighboring deployment node, updating the node rating value and the group rating value associated with the selected neighboring deployment node based on the assessment, and transmitting the updated node rating value and the updated group rating value associated with the selected neighboring deployment node to the plurality of neighboring deployment nodes.

A fourth aspect is a computer program product comprising a computer readable medium, having thereon a computer program comprising program instructions. The computer program is loadable into a data-processing unit and is adapted to cause execution of the method according to the third aspect when the computer program is run by the data-processing unit.

In some embodiments, the third and fourth aspects may additionally have features identical with or corresponding to any of the various features as explained above for the first aspect.

An advantage of some embodiments is that a robust distributed deployment network is enabled. For example, the scheduling is distributed and there is no reliance to a centralized function (no single point of failure).

Another advantage of some embodiments is that a scalable distributed deployment network is enabled. For example, all nodes may have the same (or similar) distributed deployment properties and nodes are easily added to and/or removed from the network.

A further advantage of some embodiments is that the accuracy and precision of the rating values may be increased. For example, sharing of rating values among neighboring deployment nodes may improve accuracy compared with if only a node's own measurements were used and averaging rating values over a group of rating values (to form a group rating value) may improve the precision.

Yet a further advantage of some embodiments is that the adaptive nature of the rating values relieves the burden to make precise requirement specifications at the development of a deployment node device.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a deployment node, connected to a plurality of neighboring deployment nodes of a distributed deployment network, keeps a node rating value and at least one group rating value for each neighboring deployment node and updates the rating values based on an assessment of the respective neighboring deployment node. Thus, the deployment node may form a local opinion (rating value) about a neighboring deployment node.

The deployment nodes of the network distribute the (local) rating values to their respective neighbors in a distributed estimation task (e.g. a gossip or consensus algorithm). Thereby, a global rating value regarding each node may be formed, which—by design—will eventually become known by all deployment nodes of the deployment network (see e.g. Bertrand and Moonen, "Seeing the Bigger Picture: How Nodes Can Learn Their Place Within a Complex Ad Hoc Network Topology", IEEE Signal Processing Magazine, May 2013, pp. 71-82, particularly the section "Eigenutility of Nodes" pp. 80-81).

The rating values kept by a deployment node are used to select a neighboring deployment node among the neighboring deployment nodes for transferring of an executable software module (also referred to as an executable processing unit—EPU) to the selected neighboring deployment node for deployment. Assessment of the selected neighboring deployment node may be based on an evaluation of the deployment of the transferred executable software module. In some embodiments, self-assessment is also applied.

An actor-model program (or any message-passing program) will be used as example applications herein. An actor-model program is a system where a unit of data is sent to an actor for processing, and the result (e.g. a unit of data) is passed on to another (or the same) actor for further processing. Due to its message passing nature, an actor-model program lends itself well for distribution across a distributed deployment network. One important task of a distributed deployment network is to determine where (on what deployment node) an executable software module (possibly equivalent to an actor) should be deployed, such that it can take part in an actor-model program or any message-passing program in the best possible way.

Typical applications comprise several executable software modules that collectively perform the operation of the program. The lifespan of an executable software modules is typically long, in the sense that it might migrate from one node to another (e.g. because of changing conditions) several times during its lifetime in order to meet requirements. Some typical rules that may apply in this context include that an executable software module, which is part of an executing application, must reside on a node and that an executable software module should be deployed on a node that suits its need as good as possible. As already mentioned, a distributed deployment network may iteratively update the deployment decisions (via the deployment operating system at the relevant deployment node(s)) regarding one or more executable software modules and may move each of the executable software modules to another (better suited) node when such a node becomes available during operation. In some embodiments, an executable software module may—it-self—take and update decisions regarding its own deployment (and possibly regarding deployment of other executable software modules).

It should be noted that the deployment decisions are primarily not focused on trust relationship between nodes in the security sense (trust is already established prior to deployment) but on where to best deploy the executable software module in an unknown, changing, and/or hostile world so that it can perform its task well based on the rated abilities and qualities of nodes. Using latency as an example of many possible (simultaneous) criteria for consideration, the deployment operating system may estimate the latency experienced during processing and passing of a unit of data for an executable software module, and use that information to update the shared knowledge about nodes. In particular it can compare the actual outcome with regard to latency to the expected outcome and rate the node with respect to latency.

In a typical example, a node may be rated with regard to many parameters, e.g. latency, processing capabilities, availability (uptime), sensing capabilities, precision (e.g. in measurements), closeness to location, etc. An executable software module may prescribe these parameters with different importance for achieving its best performance. The deployment decision may then, for example, be based on a weighted sum of the rating values or may use a (e.g. binary) decision tree where the rating is compared to one or more (adaptable) thresholds to determine which branch in the tree to select. Hence, one node might be more suitable for one executable software module than for another executable software module, based on their respective requirements.

The concept of having a node rating and one or more group ratings for each node means that each node is rated in two or more dimensions (e.g. the individual device, the class (type) of the device, the owner/operator or the device, etc.). For example, a device type rating may be a rating over all known devices of the same type, whereas an operator rating may be a rating of the operator contractual agreements over all their devices (regardless of device type). Due to the sharing of ratings between devices of the deployment network, in a network where a particular operator has 100 devices (nodes) and each device belongs to one of 3 vendor series, there will be 100 individual node ratings, 1 operator rating shared for all of the devices (nodes), and 3 device type ratings shared within each group of devices (nodes).

Figure 1:
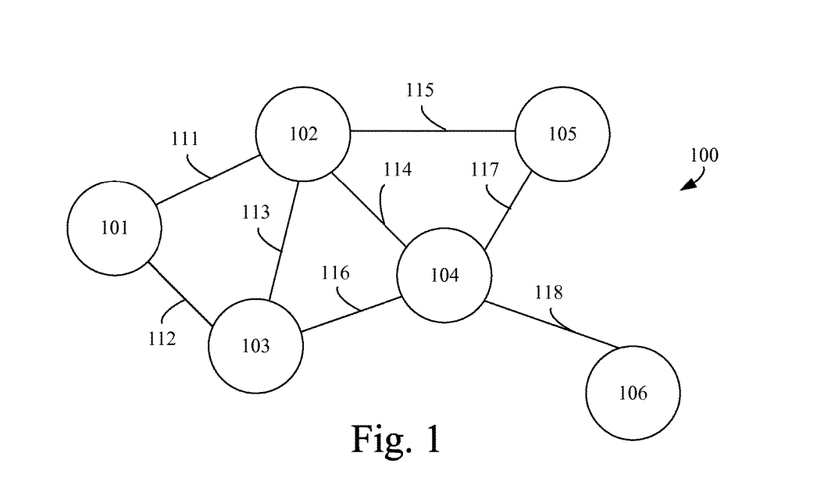
FIG. 1 is a schematic illustration of a distributed deployment network according to some embodiments.

FIG. 1 is a schematic illustration of a distributed deployment network 100 for distributed deployment of a software application separable into a plurality of executable software modules according to some embodiments. The example distributed deployment network 100 comprises six deployment nodes 101, 102, 103, 104, 105, 106.

The deployment node 101 is connected to the deployment node 102 via connection 111 and to the deployment node 103 via connection 112. The deployment node 102 is connected to the deployment node 101 via connection 111, to the deployment node 103 via connection 113, to the deployment node 104 via connection 114 and to the deployment node 105 via connection 115. The deployment node 103 is connected to the deployment node 101 via connection 112, to the deployment node 102 via connection 113 and to the deployment node 104 via connection 116. The deployment node 104 is connected to the deployment node 103 via connection 116, to the deployment node 102 via connection 114, to the deployment node 105 via connection 117 and to the deployment node 106 via connection 118. The deployment node 105 is connected to the deployment node 102 via connection 115 and to the deployment node 104 via connection 117. The deployment node 106 is connected to the deployment node 104 via connection 118.

For each deployment node (e.g. 103), the plurality of neighboring deployment nodes (e.g. 101, 102, 104) typically comprise all or a subset of the deployment nodes of the distributed deployment network 100.

The set of neighboring deployment nodes of a first deployment node may, typically, be limited by the geographical proximity to the first deployment node and/or by the "proximity" to the first deployment node in terms of one or more communication parameters and/or by another definition.

Some examples of how "proximity" in terms of one or more communication parameters may be defined include:
  the value of a message round trip time between the first deployment node and the neighboring deployment node,
  a value of a transmitted signal strength (e.g. for radio transmission) required to reach the first deployment node from the neighboring deployment node (and/or vice versa),
  whether or not it is possible to reach the first deployment node from the neighboring deployment node (and/or vice versa) using a maximum transmission signal strength (e.g. for radio transmission),
  whether or not the neighboring deployment node is connected in a same local area network (LAN) as the first deployment node,
  a number of message forward actions needed between the first deployment node the neighboring deployment node (and/or vice versa) in a routed network, and
  combination thereof.

Another definition may, for example, be that a deployment node is included in the set of neighboring deployment nodes of the first deployment node by a decision. For example, the first deployment node may determine to include another node in its set of neighboring deployment nodes if an identification number (e.g. a MAC ID or IP number) of the other deployment node is has a certain relation to its own identification number (e.g. is in a certain range of identification numbers). Alternatively or additionally, a deployment node may be included in the set of neighboring deployment nodes of the first deployment node if is belongs to a same set of nodes as the first deployment node in a higher (or lower) hierarchy layer of a layered network. Yet alternatively or additionally, a deployment node may be included in the set of neighboring deployment nodes of the first deployment node by random assignment of nodes.

Each of the connections between deployment nodes may comprise a hard-wired connection, but typically comprises a wireless connection. Furthermore, each of the connections may be direct (peer-to-peer) connection or an indirect connection, e.g. transferred via one or more other devices, such as a base station.

Thus, each of the deployment nodes has one or more neighboring deployment nodes in the example distributed deployment network 100. For example, the deployment node 103 has the neighboring network nodes 101, 102 and 104.

In a distributed deployment scenario of a software application according to some embodiments, the executable software modules of the software application are deployed on respective deployment nodes of the distributed deployment network. A deployment decision regarding an executable software module may be taken at any suitable deployment node of the distributed deployment network (either by a deployment operating system of the deployment node or by the executable software module itself). An executable software module may be transferred to a neighboring deployment node before execution of it has begun. An executable software module may also be transferred to a neighboring deployment node during execution. In such a manner an executable software module may migrate through the distributed deployment network based on how suitable the deployment nodes are in terms of deployment of the executable software module.

Figure 2:
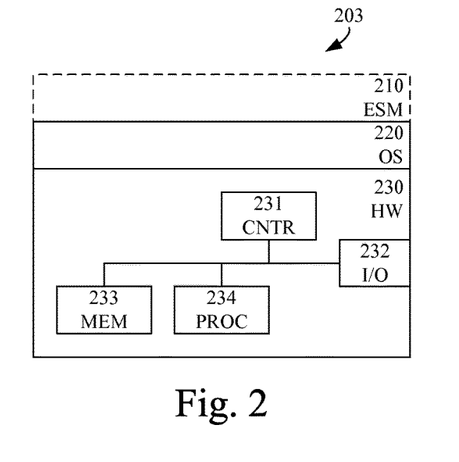
FIG. 2 is a schematic block diagram of a deployment node according to some embodiments.

FIG. 2 illustrate an example deployment node 203 according to some embodiments. The deployment node 203 may, for example, be used as one of the deployment nodes 101, 102, 103, 104, 105, 106 of the distributed deployment network 100 of FIG. 1, e.g. the deployment node 103.

The deployment node 203 comprises a deployment operating system (OS) 220 and a hardware arrangement (HW) 230 including a deployment node interface (I/O) 232.

The hardware arrangement 230 may also comprise other suitable hardware components or units, for example, a memory (MEM) 233, a processor (PROC) 234 and a controller (CNTR) 231 as illustrated in FIG. 2. The deployment node interface 232 is adapted to establish the connections between the deployment node 203 and its neighboring deployment nodes. The hardware arrangement 230 is adapted to keep (for example in the memory 233, in a register, or in a permanent storage) a node rating value associated with each of the neighboring deployment node and at least one group rating value associated with a group of deployment nodes comprising any of the neighboring deployment node. For example, the hardware arrangement 230 of the deployment node 203 (if it is used as deployment node 103 of FIG. 1) is adapted to keep one (or more, e.g. relating to different characteristics/parameters) node rating value for the deployment node 101, one (or more) rating value for the deployment node 102 and one (or more) node rating value for the deployment node 104. Furthermore, the hardware arrangement 230 of the deployment node 203 is adapted to keep at least one group rating value for a group to which the deployment node 101 belongs and similarly for the deployment nodes 102 and 104. For example, regarding the deployment node 101, there may be a node rating value, a group rating value for the manufacturer of the deployment node 101 and a group rating value for the operator of the deployment node 101. In some embodiments, the deployment node 203 may also keep node and group rating values associated with itself.

The deployment node 203 may lodge one or more executable software modules (ESM) 210. The lodging may be for execution of the executable software module on the deployment node 203 and/or for further deployment of the executable software module on a neighboring deployment node. To this end, the deployment operating system 220 and/or the executable software module 210 itself may select a neighboring deployment node for (further) deployment of the executable software module, and the deployment operating system 220 accordingly transfers the executable software module 210 to the selected neighboring deployment node via the deployment node interface 232.

The selection of the neighboring deployment node is based on the node rating values and the group rating values of the neighboring deployment nodes. For example, the selection may be according to a probability distribution of the neighboring deployment nodes, wherein the probability distribution is based on the node rating values, the group rating values, or a combination of node rating values and group rating values. The selection may be a stochastic process based on the probability distribution. This has the benefit of lowering the load for the deployment nodes with the best rating values. Note that, in a typical embodiment, the selection probability is non-zero in order to allow new (unrated) nodes into the rating system. In another example, the selection may comprise selecting the neighboring deployment node with the best rating value (best node rating value, best group rating value or best combination of node and group rating values).

The node and group rating values kept by each of the deployment nodes of a distributed deployment network is shared with the neighboring deployment nodes in a gossiping manner. Thus, the deployment operating system 220 is adapted to transmit (via the deployment node interface 232) the node and group rating values kept by the hardware arrangement 230 to the neighboring deployment nodes. This transmission may, for example, be performed at regular time intervals, each time a rating value is updated and/or on request from a neighboring deployment node. Furthermore, the deployment node interface 232 may receive node and group rating values kept by and transmitted from the neighboring deployment nodes. The received node and group rating values may be used to update the node and group rating values kept by the hardware arrangement 230.

When an executable software module 210 has been transferred to a selected neighboring deployment node, the deployment operating system 220 may perform an assessment of the deployment of the executable software module at the selected neighboring deployment node and update the node rating value and the group rating value associated with the selected neighboring deployment node based on the assessment.

Thus, nodes are peer-rated by other nodes, by direct measurements of properties and/or by continuous monitoring of properties during operation. For example, peer nodes may observe properties of neighboring nodes, e.g.:
- response time to pings, send times, receive times, etc. by taking the difference between a start and stop time of these activities,
- processing time for data that flows through the node by locally taking a start/stop time or by collaborating with another node (not under evaluation) in sending the start time to that node and taking the difference between start and stop times,
- throughput of a node by measuring how many messages can be successfully handled over a time period,
- period and jitter of sensor readings by taking the time differences between received sensor data times and calculate an average and a standard deviation,
- sensor detection of latency of an actuator by calculating the time difference between sending a control message to an actuator and when such actuation can be detected by a sensor,
- number of corrupted data or messages in relation to sent messages, and/or calculating precision of sensor readings by calculating standard deviation of a series of measurements or between several nodes' sensor readings.

Measurements as those exemplified above alone do not provide a rating value since a rating need to be related to a preferred or expected result. One way of estimating an expected result is to calculate a (weighted) average of the same type of measurement over all (or a subset of) the nodes. The rating value may then be expressed as the measurement related to a particular node divided by (or otherwise related to) the average calculated over several nodes.

Thus, the node and group rating values kept by a deployment node 203 may be updated when a new assessment is made and/or when rating values kept by a neighboring deployment node are received.

In some embodiments, the rating values that relate to different parameters (abilities, qualities) may be given different weights in the selection process. One way of updating rating values may comprise increasing a weight in proportion to a reduction of the corresponding parameter performance (and vice versa), thus making that parameter more important for the selection. For example, the weight for latency may be increased in relation to the weight for measurement precision if an executable software module experiences decreased ratings of latency but no changes in ratings for measurement precision.

The deployment node 203 may also receive an executable software module 210 from a neighboring deployment node who has selected the deployment node 203 for deployment of the executable software module 210. If the deployment node 203 keeps node and group rating values associated with itself, it may perform a self-assessment during deployment of the received executable software module 210 on the deployment node 203 and update the corresponding rating values accordingly.

Figure 3:
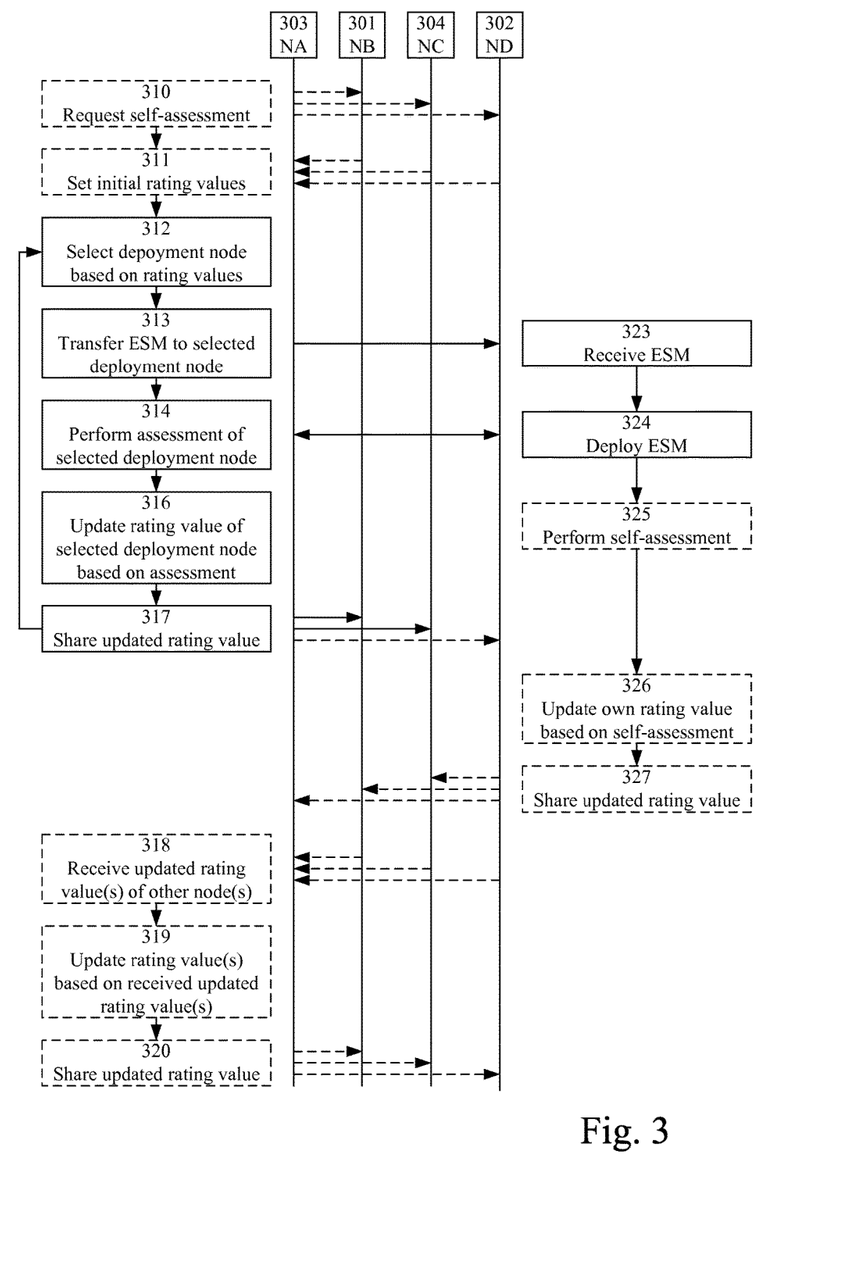
FIG. 3 is a flowchart illustrating example method steps according to some embodiments.

FIG. 3 illustrate example method steps and signaling between deployment nodes (NA, NB, NC, ND) 303, 301, 304, 302 of a distributed deployment network. The deployment node 303 may, for example, correspond to the deployment nodes 203 of FIG. 2 and 103 of FIG. 1.

The deployment node 303 keeps rating values related to each of the neighboring deployment nodes 301, 302, 304 as has been explained above, and these rating values may be initiated (step 311) by requesting (step 310) the neighboring deployment nodes to send their respective self-assessment rating values (which may initially be a default value).

The rating values of the neighboring deployment nodes are used (step 312) for selection of a neighboring deployment node to be used for deployment of an executable software module in a manner that has been described above, and the executable software module is transferred (step 313) from the deployment node 303 to the selected neighboring deployment node 302 for deployment.

The executable software module is received by the selected neighboring deployment node 302 in step 323 and deployed therein in step 324.

During (or after) deployment of the executable software module by the selected neighboring deployment node 302, the deployment node 303 performs an assessment of the deployment (step 314) and updates the kept rating values accordingly (step 316) as has been elaborated on above.

Furthermore, during (or after) deployment of the executable software module by the selected neighboring deployment node 302, the deployment node 302 may perform a self-assessment of the deployment in step 326 and update its kept rating values accordingly in step 327.

The deployment node 303 may also update the kept rating values based on corresponding rating values received from one or more of the neighboring deployment nodes 301, 302, 304 as illustrated in steps 318 and 319.

The deployment node 303 may also share its kept rating values with one or more of the neighboring deployment nodes 301, 302, 304 as has been elaborated in above. The sharing may take place at regular time intervals, each time a rating value is updated (as illustrated by steps 317 and 320, and by step 327 for deployment node 302) and/or on request from a neighboring deployment node.

It should be noted that one deployment node may be adapted to perform both the method steps illustrated in FIG. 3 for the deployment node 303 and the method steps illustrated in FIG. 3 for the deployment node 302.

In a typical embodiment, the local rating value is kept separately from the global rating value, the local rating value is updated in situations similar to steps 316 and 326 or FIG. 3 and the global rating value is updated in situations similar to step 319 of FIG. 3. In other embodiments, the local rating value and the global rating value may be merged into a single rating value and may be updated (possibly using different update algorithms) in situations similar to steps 316, 326 and 319.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a mobile radio terminal, a base station, a computer, a USB-stick, a plug-in card, or an embedded drive.

Figure 4:
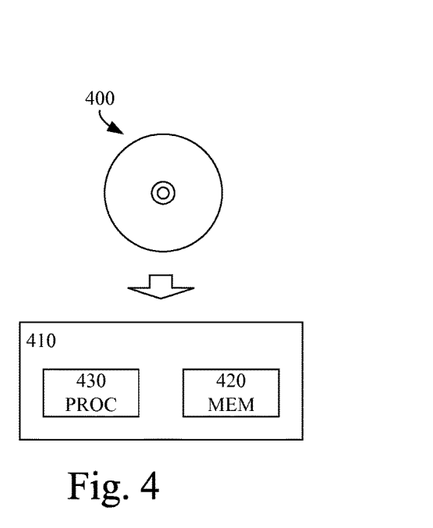
FIG. 4 is a schematic drawing illustrating a computer readable medium according to some embodiments.

According to some embodiments, a computer program product comprises a computer readable medium such as, for example, a diskette or a CD-ROM as illustrated by the CD-ROM 400 of FIG. 4. The computer readable medium 400 may have stored thereon a computer program comprising program instructions. The computer program may be loadable into a data-processing unit 430, which may, for example, be comprised in a deployment node 410 of a distributed deployment network (compare with e.g. 103 of FIG. 1, 203 of FIG. 2 and/or 303 of FIG. 3). When loaded into the data-processing unit 430, the computer program may be stored in a memory 420 associated with or integral to the data-processing unit 430. According to some embodiments, the computer program may, when loaded into and run by the data-processing unit 430, cause the data-processing unit to execute method steps according to, for example, the methods shown in FIG. 3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A first deployment node connectable to a plurality of neighboring deployment nodes of a distributed deployment network for distributed deployment of a software application separable into a plurality of executable software modules, the first deployment node comprising:
   a hardware arrangement;
   a deployment operating system; and
   a deployment node interface,
   the deployment node interface adapted to establish a connection between the first deployment node and the plurality of neighboring deployment nodes;
   the hardware arrangement adapted, for each of the neighboring deployment nodes, to keep a node rating value associated with the neighboring deployment node and at least one group rating value associated with a group of deployment nodes comprising the neighboring deployment node;
   the deployment operating system adapted to transfer a first executable software module from the first deployment node to a selected neighboring deployment node for deployment, wherein the selected neighboring deployment node is selected among the neighboring deployment nodes based on the node rating values and the group rating values of the neighboring deployment nodes;
   the deployment operating system adapted to perform an assessment of the deployment of the first executable software module at the selected neighboring deployment node;
   the deployment operating system adapted to update the node rating value and the group rating value associated with the selected neighboring deployment node based on the assessment; and
   the deployment operating system adapted to transmit the updated node rating value and the updated group rating value associated with the selected neighboring deployment node to the plurality of neighboring deployment nodes.

2. The first deployment node of claim 1, wherein:
   the hardware arrangement is further adapted to keep a node rating value associated with the first deployment node and at least one group rating value associated with a group of deployment nodes comprising the first deployment node;
   the deployment node interface is further adapted to receive a second executable software module from one of the plurality of neighboring deployment nodes for deployment;
   the deployment operating system is further adapted to cause deployment of the second executable software module using the hardware arrangement;
   the deployment operating system is further adapted to perform a self-assessment of the deployment of the second executable software module at the first deployment node;
   the deployment operating system is further adapted to update the node rating value and the group rating value associated with the first deployment node based on the self-assessment; and
   the deployment operating system is further adapted to transmit the updated node rating value and the updated group rating value associated with the first deployment node to the plurality of neighboring deployment nodes.

3. The first deployment node of claim 1, wherein:
   the deployment node interface is further adapted to receive, from one or more of the plurality of neighboring deployment nodes, indications of a node rating value and a group rating value associated with a particular one of the plurality of neighboring deployment nodes and kept by the one or more of the plurality of neighboring deployment nodes;
   the operating system is further adapted to update the node rating value and the group rating value associated with the particular neighboring deployment node and kept by the first deployment node based on the received indications; and
   the deployment operating system is further adapted to transmit the updated node rating value and the updated group rating value associated with the particular neighboring deployment node and kept by the first deployment node to the plurality of neighboring deployment nodes.

4. The first deployment node of claim 1, wherein the deployment operating system is further adapted to select the selected neighboring deployment node among the neighboring deployment nodes based on the node rating values and the group rating values of the neighboring deployment nodes.

5. The first deployment node of claim 4 wherein the deployment operating system is further adapted to select the selected neighboring deployment node according to a probability distribution of the neighboring deployment nodes, wherein the probability distribution is based on the node rating values and the group rating values kept by the first deployment node.

6. The first deployment node of claim 1, wherein each group of deployment nodes comprises deployment nodes of one of: a particular type, a particular manufacturer, a particular supplier, and a particular operator.

7. A distributed deployment network for distributed deployment of a software application separable into a plurality of executable software modules, the distributed deployment network comprising the first deployment node according to claim 1 and a plurality of other deployment nodes.

8. A method of a first deployment node connectable to a plurality of neighboring deployment nodes of a distributed deployment network for distributed deployment of a software application separable into a plurality of executable software modules, the method comprising:
   keeping, for each of the neighboring deployment nodes, a node rating value associated with the neighboring deployment node and at least one group rating value associated with a group of deployment nodes comprising the neighboring deployment node;

selecting a neighboring deployment node among the neighboring deployment nodes based on the node rating values and the group rating values of the neighboring deployment nodes;

transferring a first executable software module from the first deployment node to the selected neighboring deployment node for deployment;

performing an assessment of the deployment of the first executable software module at the selected neighboring deployment node;

updating the node rating value and the group rating value associated with the selected neighboring deployment node based on the assessment; and transmitting the updated node rating value and the updated group rating value associated with the selected neighboring deployment node to the plurality of neighboring deployment nodes.

9. The method of claim 8, further comprising:

keeping a node rating value associated with the first deployment node and at least one group rating value associated with a group of deployment nodes comprising the first deployment node;

receiving a second executable software module from one of the plurality of neighboring deployment nodes for deployment;

deploying the second executable software module using the hardware arrangement;

performing a self-assessment of the deployment of the second executable software module at the first deployment node;

updating the node rating value and the group rating value associated with the first deployment node based on the self-assessment; and transmitting the updated node rating value and the updated group rating value associated with the first deployment node to the plurality of neighboring deployment nodes.

10. The method of claim 8, further comprising:

receiving, from one or more of the plurality of neighboring deployment nodes, indications of a node rating value and a group rating value associated with a particular one of the plurality of neighboring deployment nodes and kept by the one or more of the plurality of neighboring deployment nodes;

updating the node rating value and the group rating value associated with the particular neighboring deployment node and kept by the first deployment node based on the received indications; and transmitting the updated node rating value and the updated group rating value associated with the particular neighboring deployment node and kept by the first deployment node to the plurality of neighboring deployment nodes.

11. The method of claim 8, wherein the selection of a neighboring deployment node is according to a probability distribution of the neighboring deployment nodes, wherein the probability distribution is based on the node rating values and the group rating values kept by the first deployment node.

12. The method of claim 8, wherein each group of deployment nodes comprises deployment nodes of one of: a particular type, a particular manufacturer, a particular supplier, and a particular operator.

13. A computer program product comprising a nontransitory computer readable medium, having thereon a computer program comprising program instructions, the computer program being loadable into a data-processing unit and adapted to cause execution of a method when the computer program is run by the data-processing unit, wherein the method is of a first deployment node connectable to a plurality of neighboring deployment nodes of a distributed deployment network for distributed deployment of a software application separable into a plurality of executable software modules, and wherein the method comprises:

keeping, for each of the neighboring deployment nodes, a node rating value associated with the neighboring deployment node and at least one group rating value associated with a group of deployment nodes comprising the neighboring deployment node;

selecting a neighboring deployment node among the neighboring deployment nodes based on the node rating values and the group rating values of the neighboring deployment nodes;

transferring a first executable software module from the first deployment node to the selected neighboring deployment node for deployment;

performing an assessment of the deployment of the first executable software module at the selected neighboring deployment node;

updating the node rating value and the group rating value associated with the selected neighboring deployment node based on the assessment; and transmitting the updated node rating value and the updated group rating value associated with the selected neighboring deployment node to the plurality of neighboring deployment nodes.

\* \* \* \* \*